(12) United States Patent  (10) Patent No.: US 8,687,127 B2
Kinoshita et al.  (45) Date of Patent: Apr. 1, 2014

(54) VIDEO DISPLAY APPARATUS AND EXTERNAL POWER-SUPPLY APPARATUS

(75) Inventors: Teruo Kinoshita, Nishitama-gun (JP); Tomohiro Hiruma, Higashiyamato (JP); Fumihiko Murakami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/414,362

(22) Filed: Mar. 7, 2012

(65) Prior Publication Data

US 2012/0320283 A1 Dec. 20, 2012

(30) Foreign Application Priority Data

Jun. 14, 2011 (JP) ................................. 2011-132702

(51) Int. Cl.
H04N 5/63 (2006.01)

(52) U.S. Cl.
USPC ....................................................... 348/730

(58) Field of Classification Search
USPC .......... 348/730, 705, 706, 725; 455/572–574, 455/341.1–343.6
See application file for complete search history.

(56) References Cited

U.S. PATENT DOCUMENTS

| 5,333,176 | A  | * | 7/1994  | Burke et al. ................... 455/557 |
| 5,883,497 | A  | * | 3/1999  | Turnbull ....................... 320/132 |
| 6,828,761 | B1 | * | 12/2004 | Suzuki et al. ................. 320/132 |
| 7,107,160 | B2 | * | 9/2006  | Bean ................................ 702/63 |
| 7,225,086 | B2 |   | 5/2007  | Naitoh et al. |
| 7,538,826 | B2 | * | 5/2009  | Englert ......................... 348/730 |
| 8,164,468 | B2 | * | 4/2012  | Gofman et al. ............. 340/636.2 |
| 8,271,053 | B2 | * | 9/2012  | Choi et al. ..................... 455/573 |
| 8,380,332 | B2 | * | 2/2013  | Suzuki ............................. 700/94 |
| 2005/0267999 | A1 |  | 12/2005 | Suematsu et al. |
| 2010/0082414 | A1 |  | 4/2010  | Shimaya |
| 2010/0277130 | A1 | * | 11/2010 | Tsuji .............................. 320/152 |
| 2012/0123604 | A1 | * | 5/2012  | Littrell .......................... 700/295 |
| 2012/0320284 | A1 | * | 12/2012 | Oya ............................... 348/730 |
| 2013/0038275 | A1 | * | 2/2013  | Chen et al. .................... 320/107 |

FOREIGN PATENT DOCUMENTS

| JP | H 06333677  | 12/1994 |
| JP | 2000081932  | 3/2000  |
| JP | 2003029885  | 1/2003  |
| JP | 2003223160  | 8/2003  |
| JP | 2004147022  | 5/2004  |
| JP | 2004178608  | 6/2004  |
| JP | 2004364095  | 12/2004 |
| JP | 2005085027  | 3/2005  |

(Continued)

OTHER PUBLICATIONS

Japanese Patent Application No. 2011-132702, First Office Actiion, mailed Jul. 17, 2012, (with English Translation).

(Continued)

*Primary Examiner* — Paulos M Natnael
(74) *Attorney, Agent, or Firm* — Blakely, Sokoloff, Taylor & Zafman LLP

(57) ABSTRACT

According to one embodiment, a video display apparatus including, a first power-supply module configured to be charged while a commercially available power is connected, a second power-supply module connected as an external apparatus and configured to be charged together with the first power-supply module while the commercially available power is connected, and a power switching module configured to supply power from at least one of the first and second power-supply modules upon receipt of an instruction to stop connection with the commercially available power.

8 Claims, 12 Drawing Sheets

(56) References Cited

FOREIGN PATENT DOCUMENTS

| | | |
|---|---|---|
| JP | 3730414 | 10/2005 |
| JP | 2005-339067 | 12/2005 |
| JP | 2006203353 | 8/2006 |
| JP | 3127721 | 11/2006 |
| JP | 2007129392 | 5/2007 |
| JP | 2009021821 | 1/2009 |
| JP | 2009-118630 | 5/2009 |
| JP | 2009140507 | 6/2009 |
| JP | 2010-079025 | 4/2010 |
| JP | 3166634 | 2/2011 |

OTHER PUBLICATIONS

Japanese Patent Application No. 2013-005604, First Office Action, mailed Oct. 22, 2013, (with English Translation).

Phileweb Editorial Office, "Toshiba will release in July the REGZA equipped with a 'peak-shift function' that enables 3hour viewing and listening with a contained battery," Apr. 20, 2011, Internet <URL: http://www.phileweb.com/news/d-av/201104/28285.html>.

* cited by examiner

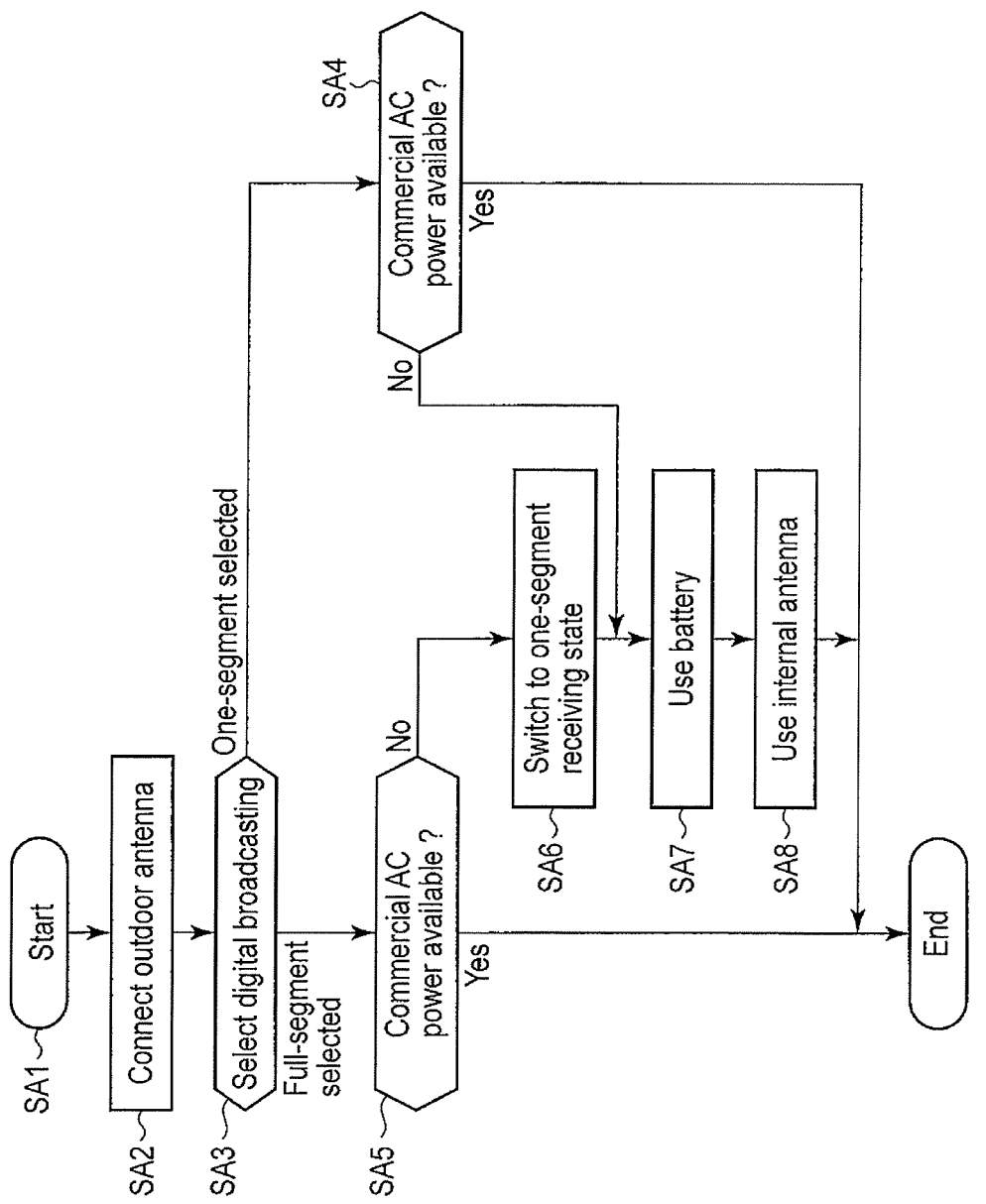
F I G. 3

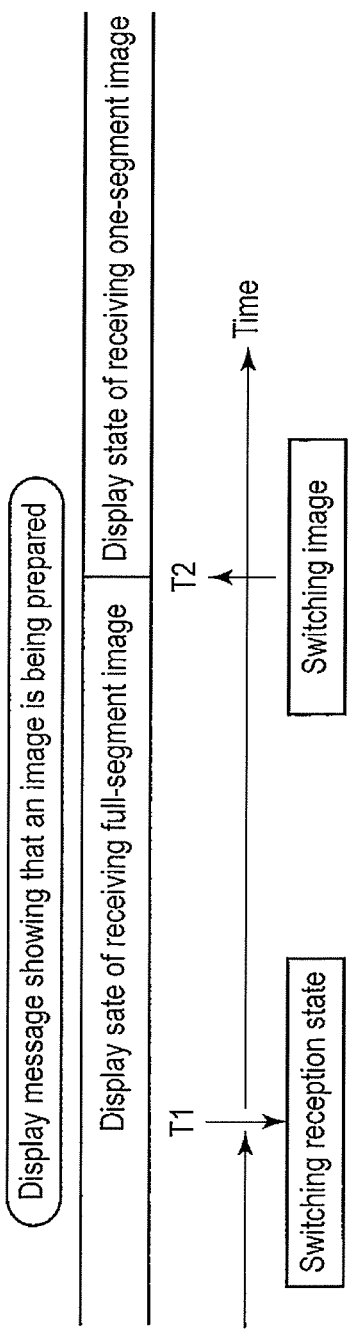
F I G. 5

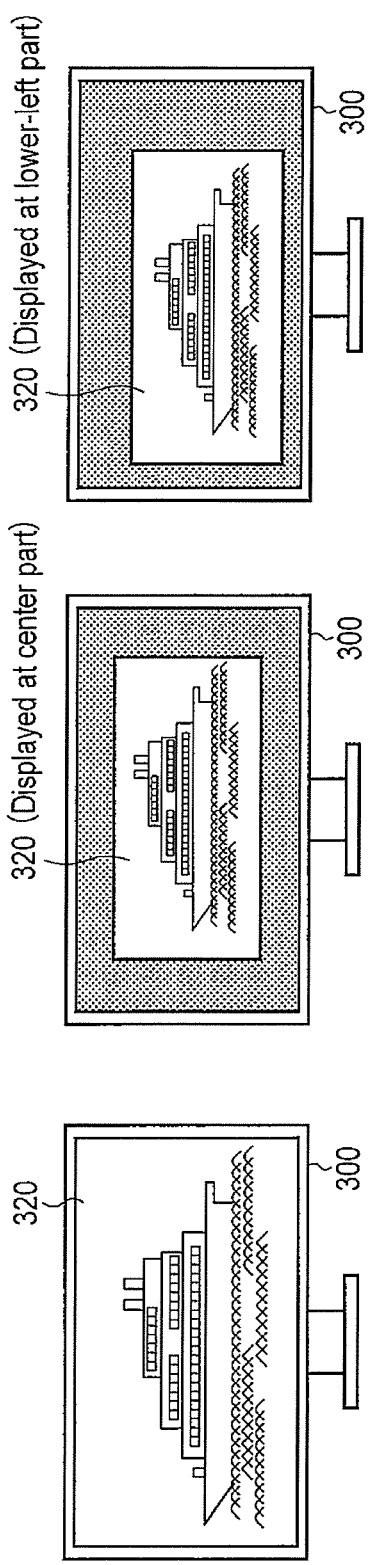

F I G. 7A
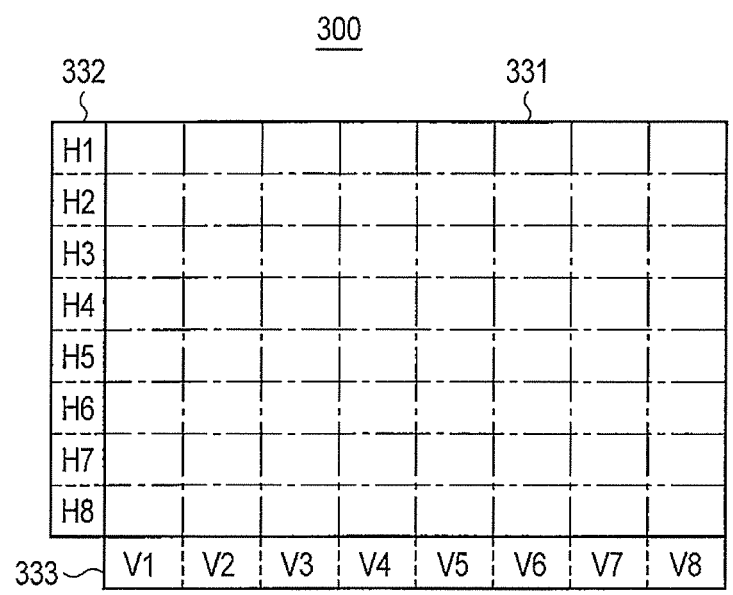
F I G. 7B
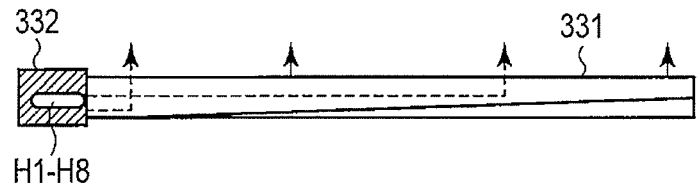

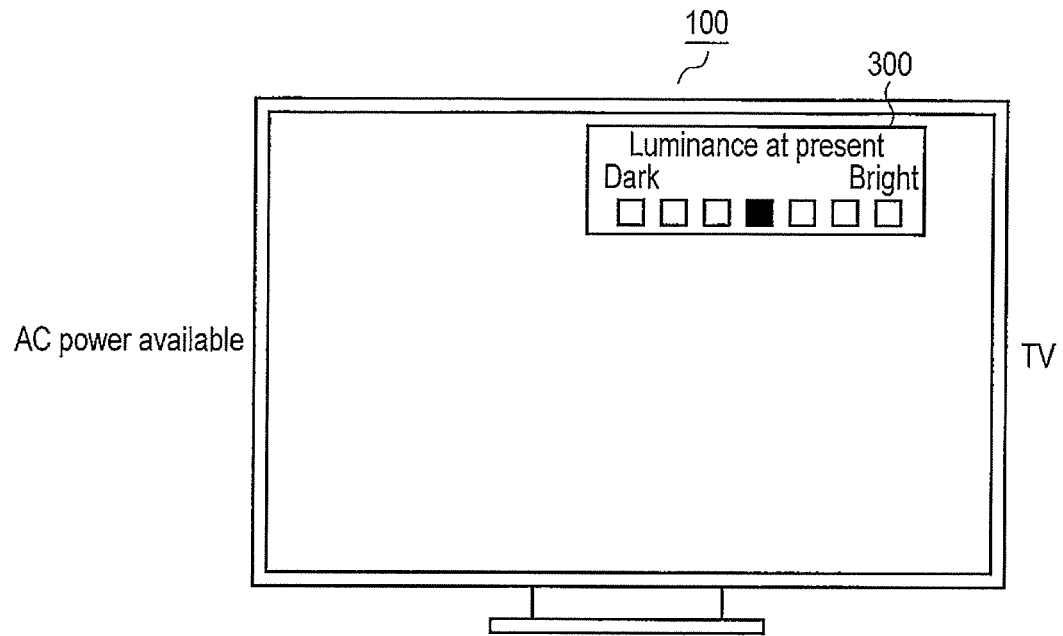
F I G. 1 3 A
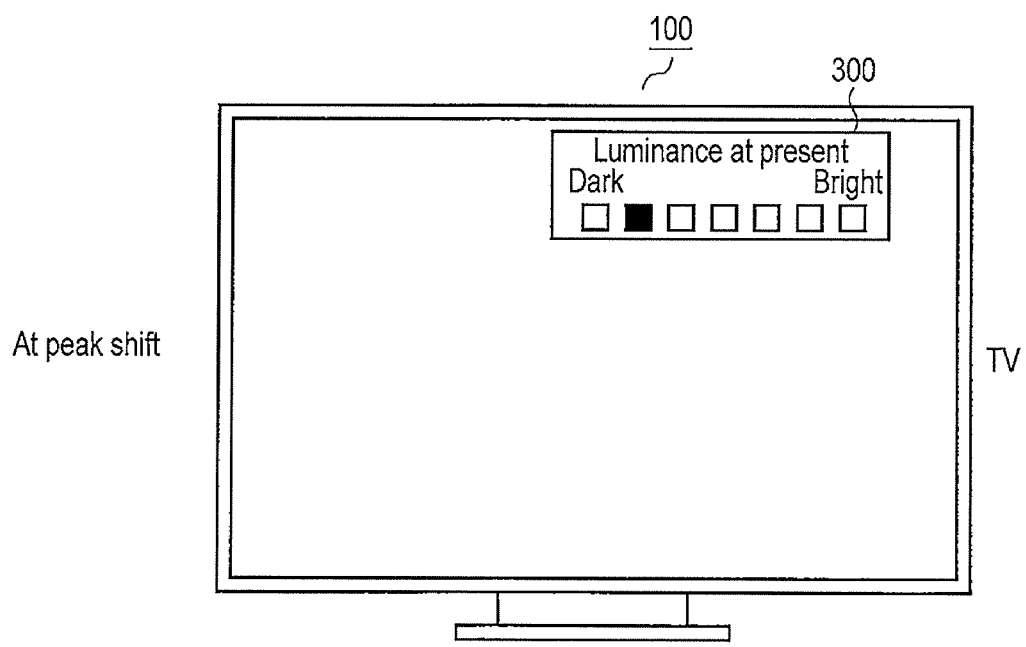
F I G. 1 3 B

VIDEO DISPLAY APPARATUS AND EXTERNAL POWER-SUPPLY APPARATUS

CROSS-REFERENCE TO RELATED APPLICATIONS

This application is based upon and claims the benefit of priority from prior Japanese Patent Application No. 2011-132702, filed Jun. 14, 2011, the entire contents of which are incorporated herein by reference.

FIELD

Embodiments described herein relate generally to a video display apparatus and an external power supply apparatus capable of operating using a non-commercial power source.

BACKGROUND

For example, video display devices, which are portable electronic devices such as personal computers, are capable of operating even without connection with a commercially available power source. In the field of television receivers configured to receive television broadcasting, the types that operate using mainly a battery have been commercially practical.

In recent years, electricity saving has been a big topic, especially with the power supplied from power plants of electricity supply companies. When the total amount of power consumption of a jurisdictional area becomes greater than the amount of power supplied from the power plants, a blackout might occur and cause serious damage to factories, hospitals, and the like.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary diagram showing an example of a flowchart explaining how the television receiver of FIG. 1 operates, according to an embodiment;

FIG. 5 is an exemplary diagram showing an example of a time at which the reception state is switched from the full-segment receiving state to the one-segment receiving state, and an example of the time at which the image is actually switched from the full-segment image to the one-segment image, according to an embodiment;

FIG. 6A, FIG. 6B, FIG. 6C, FIG. 6D and FIG. 6E are exemplary diagrams, each showing images of the display while the television receiver of FIG. 1 is set in the power saving mode, according to an embodiment;

FIG. 7A and FIG. 7B are exemplary diagrams, each showing an exemplary structure of the backlight unit of the display of the television receiver of FIG. 1, according to an embodiment;

FIG. 13A is an exemplary diagram showing an example of a luminance indicator temporarily displayed when the television receiver starts operating on commercially available AC power, according to an embodiment; and FIG. 13B is an exemplary diagram showing an example of a luminance indicator temporarily displayed when the television receiver is set to the peak-shift mode, according to an embodiment.

DETAILED DESCRIPTION

Various embodiments will be described hereinafter with reference to the accompanying drawings. In general, according to one embodiment, a video display apparatus comprising: a first power-supply module configured to be charged while a commercially available power is connected; a second power-supply module connected as an external apparatus and configured to be charged together with the first power-supply module while the commercially available power is connected; and a power switching module configured to supply power from at least one of the first and second power-supply modules upon receipt of an instruction to stop connection with the commercially available power.

Embodiments will now be described hereinafter in detail with reference to the accompanying drawings.

Figure 1:
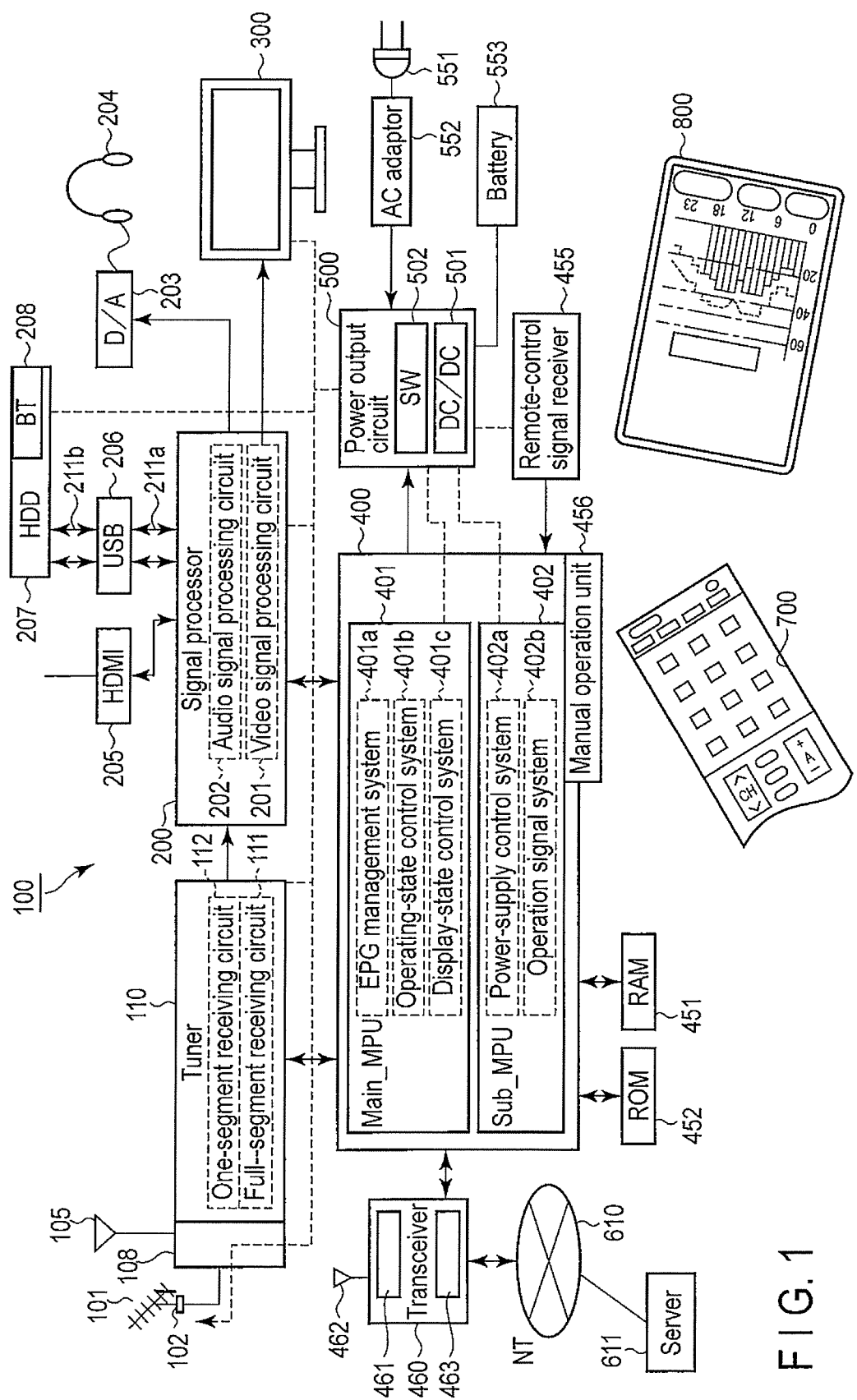
FIG. 1 is an exemplary diagram showing an example of a block diagram of a representative overall configuration of a television receiver, according to an embodiment.

FIG. 1 shows an example of a video display device, such as a television receiver and a personal computer (PC), to which the embodiment is applied. The elements, structures, or functions that will be described below may be implemented either as hardware or software using microprocessors (CPU, processors, etc.), for example.

In the video display device (television receiver) shown in FIG. 1, a UHF antenna 101 catches electronic waves of terrestrial television broadcasting, and includes a booster 102, to which power is supplied. In the current terrestrial digital broadcasting, a twelve-segment (it may be referred to a full-segment or a full-seg) broadcast signal and a one-segment (it may be referred to one-seg) broadcast signal are set. The UHF antenna 101 is used in order to receive at least full-segment broadcast signals.

As a matter of course, one-seg broadcast signals can also be received via the UHF antenna 101. An indoor antenna 105 is used when one-segment broadcast signals are mainly received.

One-segment broadcast signals can be received using the indoor antenna 105 in some cases. Such cases include when the distance between the antenna and the broadcast station is relatively small, when there are few obstacles that interrupt the broadcast signals (electronic waves) in an area of approximately 10 km or between the antenna and the broadcast station, when the height above the seal level is relatively great, and when the reception position is at a high place, for example.

The UHF antenna 101 may also be referred to as exterior antenna or outdoor antenna, and the interior antenna 105 may also be referred to as inner antenna or indoor antenna.

The interior antenna 105 is integrally formed in the television receiver, and may be replaced with a one-seg antenna 106, which mainly receives one-seg broadcast signals. The one-seg antenna 106 can be formed in a monopole type (rod antenna), for example, and fixed to a frame or a housing of the television receiver. The one-seg antenna 106 may include a stand (legs) and be positioned in the vicinity of the television receiver so as to stand on its own.

The one-seg antenna 106 functions as a diversity antenna by being used in combination with the interior antenna 105.

The UHF antenna 101 can be connected to a tuner 110 via an antenna connection board 108. The indoor antenna 105 can be connected to the tuner 110 via the antenna connection board 108. In case, to use the indoor antenna 105 in place of the UHF antenna 101, the terminal of the UHF antenna 101 is pulled from the connector of the antenna connection board 108, and the terminal of the indoor antenna 105 is connected to the connector of the antenna connection board 108. Both the UHF antenna 101 and the indoor antenna 105 may be connected at all times to the two connectors of the antenna connection board 108, respectively. In this case, a changeover switch may be operated to connect either the UHF antenna 101 or the indoor antenna 105 to the tuner 110, so that the antenna selected may be used.

As described above, the antenna connected to the antenna connection board 108 during one-segment reception may be set to one of the indoor antenna 105 and the integral antenna 106 by a switching module 107. When the indoor antenna 105 and the one-seg antenna 106 make an output to the antenna connection board 108, only one of the outputs may be selected according to switching by the switching module 107 (i.e., the antenna used to receive broadcast signals is automatically switched).

The tuner 110 includes a full-segment receiving circuit 111 and a one-segment receiving circuit 112. The full-segment receiving circuit 111 or the one-segment receiving circuit 112 is set to a signal receiving state in accordance with a control signal output from a control block 400. The control block 400 will be described later in detail.

The tuner 110 is operated to select a channel. The program signal of the channel selected in the tuner 110 is demodulated and input to a signal processor 200. The signal processor 200 includes a video signal processing circuit 201 and an audio signal processing circuit 202. The video signal processing circuit 201 decodes an encoded video signal to a base-band video signal. As encoding and decoding schemes, there are the Moving Picture Experts Group (MPEG) and H.264/Advanced Video Coding (AVC) system, etc., for example. The base-band video signal output from the video signal processing circuit 201 is supplied to a display 300.

The audio signal processing circuit 202 acquires an audio stream from the program signal and then decodes the audio stream. The decoded audio signal is supplied to a digital-to-analog converter 203 and converted to an analog audio signal which is supplied to a speaker 204. In the system of FIG. 1, the speaker 204 is shown as a headphone. The headphone can, of course, be replaced by a stationary speaker.

The signal processor 200 can be connected to an external apparatus under the control of the control block 400. The signal processor 200 can be connected by, for example, a high-definition multimedia interface (HDMI) 205 to an external data record/playback apparatus such as an optical disk player, for example a DVD or BD (trademark) player. The signal processor 200 can therefore receive playback signals from the external data record/playback apparatus and process these signals to generate video and audio output signals. Further, the signal processor 200 can transmit the signals used for recording to the external data record/playback apparatus.

Under control of the control block 400, the signal processor 200 also can be connected via a universal serial bus (USB) 206 to a hard disk drive (HDD) 207. The hard disk drive 207 incorporates a battery 208, and can keep operating for two to three hours upon a blackout by using the battery. Moreover, the hard disk drive 207 can supply power from the battery to some other blocks shown in FIG. 1 under the control signal.

The battery 208 is charged by power supply from the television receiver via power lines 211a, 211b independent of the USB cable used for connection with the USB 206. In FIG. 1, an example is shown in which the power line is divided by the USB 206. Since the power line is a dedicated line, however, the USB 206 does not necessarily need to be bypassed, and the topology and the route of the power line may be arbitrarily set as long as power is supplied from the television receiver to the battery 208. As the USB cable, a cable obtained by integrally forming a data line group 1211d, which is included in a usual USB cable, and a power line 1211p into the same connector (package) may also be used.

The control block 400 includes a main microprocessor unit (hereinafter referred to as "main MPU") 401 and a sub-microprocessor unit (hereinafter referred to as "sub-MPU") 402. The main MPU 401 includes an electronic program guide management system (hereinafter referred to as an "EPG management system) 401a, an operating-state control system 401b, and a display-state control system 401c.

The components 400, 401 and 402 and the components 401a, 401b and 401c may be given names other than those specified above. They may be called, for example, "main control circuit", "sub-control circuit", "EPG processing circuit", "operating-state control circuit" and "display-state control circuit". Alternatively, they may be called "modules" or "blocks". Their names specified above accord with the functions they perform. Instead, other names may be used, each indicating that two or more components are integrated or combined.

The EPG management system 401a acquires program data through the Internet or the program data contained in a broadcast signal, and generates program list data. The program list data can be stored in a random access memory (hereinafter referred to as "RAM") 451. Further, the EPG management system 401a can cooperate with the display-state control system 401c to read the program list stored in the RAM 451 and output the same to the display 300. Moreover, the EPG management system 401a can correct and change in periodically the program data stored in the RAM 451.

The RAM 451 may be any memory in which data can be written and from which data can be read, and can therefore be a nonvolatile memory. The RAM 451 may, of course, store various data items (e.g., icons, warning messages, and channel numbers). A read only memory (ROM) 452 is connected to the control block 400, and stores various software items for use in the television receiver 100. The software is extended in, for example, the RAM 451, operating the television receiver 100 in accordance with signals and instructions the user has input.

In response to the state signals generated internally or supplied externally or to operation signals supplied externally, the operating-state control system 401b controls the blocks incorporated in the television receiver 100. The operating-state control system 401b can switch the tuner 110, from the one-segment receiving state to the full-segment receiving state, or vice versa. Further, the operating-state control system 401b can control the signal processing state in the signal processor 200. Still further, the operating-state control system 401b can control color adjustment, luminance adjustment, partial shut-off of power supply, and the like, automatically or manually in accordance with the conditions preset.

The display-state control system 401c can adjust the backlight of the display 300 and control the illumination area of the backlight. The display-state control system 401c can further control the luminance of the video signal, the image magnification and reduction and the motion of a display position.

The sub-MPU 402 includes a power-supply control system 402a and an operation signal system association system 402b. The power-supply control system 402a operates under a direct current (DC) of ±5V supplied from the DC/DC converter 501, and is used for operation of the main MPU 401. Control by the power-supply control system 402a mainly includes turning on/off supply of ±12V and 31V (or 24V) to the main MPU 401, and supplying a driving current of the backlight of the display 300, for example. The power required for a standby state, in which the operation signal association system 402b receives an operation signal from the remote controller 700, as will be described later, is maintained (i.e., supplied from the AC adaptor 552) under the control of the power-supply control system 402a, unless it becomes practically impossible to supply power since the plug 551 is not connected to (pulled out from) a commercially available power (receptacle), or the amount of charge of the battery 553 has decreased below a non-discharge level, for example.

When an operation signal transmitted from the remote controller 700 is input via the remote controller signal receiver 455, the operation signal association system 402b analyzes the operation signal. The operation signal association system 402b controls the operation state of the television receiver according to the analysis result of the operation signal. The control of the operation state includes turning on/off the main power source, activating/deactivating the main MPU 401, and providing the sub-MPU 402 with an instruction. The operation signal may be input via a manual operating portion 456, as well as via the remote controller receiver 455. When the manual operating module 456 is operated by the user, the operation signal is analyzed by the operation signal association system 402b.

Next, a power-supply system will be described. A commercially available alternating-current source drawn from the plug 551 is rectified by the AC adaptor 552 and input to the power output circuit 500. The power output circuit 500 converts the output of the AC adaptor 552 into a variety of direct-current voltages. When an AC adaptor is not available, the power output circuit 500 rectifies the commercially available alternating-current source and generates direct-current voltages of different values. The power output circuit 500 can derive power from the battery 553. The power output circuit 500 causes the DC/DC converter 501 to convert the direct-current voltage from the battery 553 to generate direct-current voltages of different values.

The power output circuit 500 may switch the power usage state of the television receiver between a commercially available power usage state and a battery power usage state, under the control of the power-supply control system 402. The power usage state is switched when a switch (SW) 502 is controlled by the power control system 402. Preferably, the switch 502 should include at least two systems of contacts, and all the contacts should not be turned on/off simultaneously. It is also preferable that the switch 502 includes a switching element or a non-contact switch, such as a solid-state relay (SSR), capable of controlling turning on/off of the contact according to variation in supplied voltage, for example, like a power strip.

A transceiver 460 is connected to the control block 400. The transceiver 460 includes a short-distance communication device 461. The short-distance communication device 461 can communicate with a mobile terminal 800 via an antenna 462. The transceiver 460 further includes a network communication device 463. The network communication device 463 is connected to a network 610, and can perform data communication with a server 611. The mobile terminal 800 may be one of various types, such as a mobile telephone. The mobile terminal 800 has, at least, a transceiver, a display, an operation unit and a signal processor and is small enough to carry.

Figures 2A, 2B:
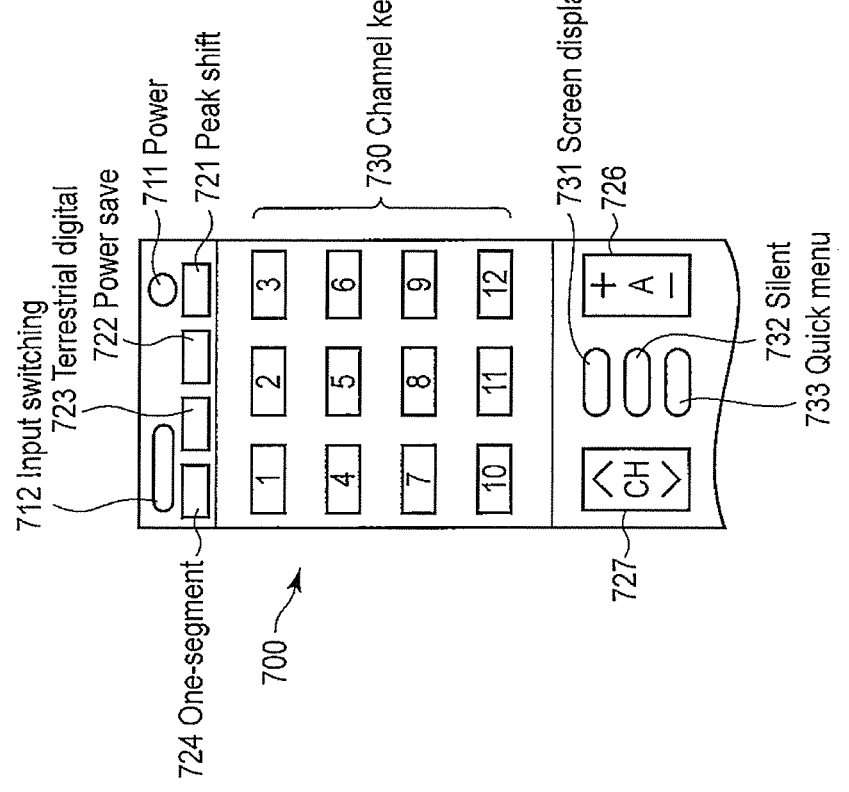
FIG. 2A and FIG. 2B are exemplary diagrams, each showing an example of outlining a representative configuration of a remote controller, according to an embodiment.

FIG. 2A and FIG. 2B shows the various buttons provided on the remote controller 700. The power button 711 may be pushed to turn on or off the television receiver 100. As the user repeatedly pushes the power button 711, the television receiver 100 is repeatedly turned on and off. Even if television receiver 100 is turned off state, the power output circuit 500 keeps supplying auxiliary power to the sub-MPU 402 and short-distance communication device 461. The sub-MPU 402 and short-distance communication device 461 can therefore receive operation signals from the remote controller 700. The input switching button 712 may be used to switch the television receiver 100 in a state of receiving an input from an external apparatus connected to the television receiver 100.

Assume that the input switching button 712 is repeatedly pushed. Then, the operating state of the television receiver 100 is cyclically changed to the digital-broadcast receiving state, the HDMI-signal receiving state, the video input state and the D-terminal input state. If the input switching button 712 is further pushed, the operating state of the television receiver 100 is changed back to the digital-broadcast receiving state.

The remote controller 700 has a peak-shift button 721, too.

The peak-shift button 721 can be used to set the television receiver 100 to a power-save cooperation mode. In the power-save cooperation mode, the television receiver 100 saves the commercially available power (i.e., power supplied from the power generation plant of the electric power company). If the peak-shift button 721 is pushed while the television receiver 100 remains in the standby state, the television receiver 100 is switched to, for example, the battery-driven mode.

Figure 4:
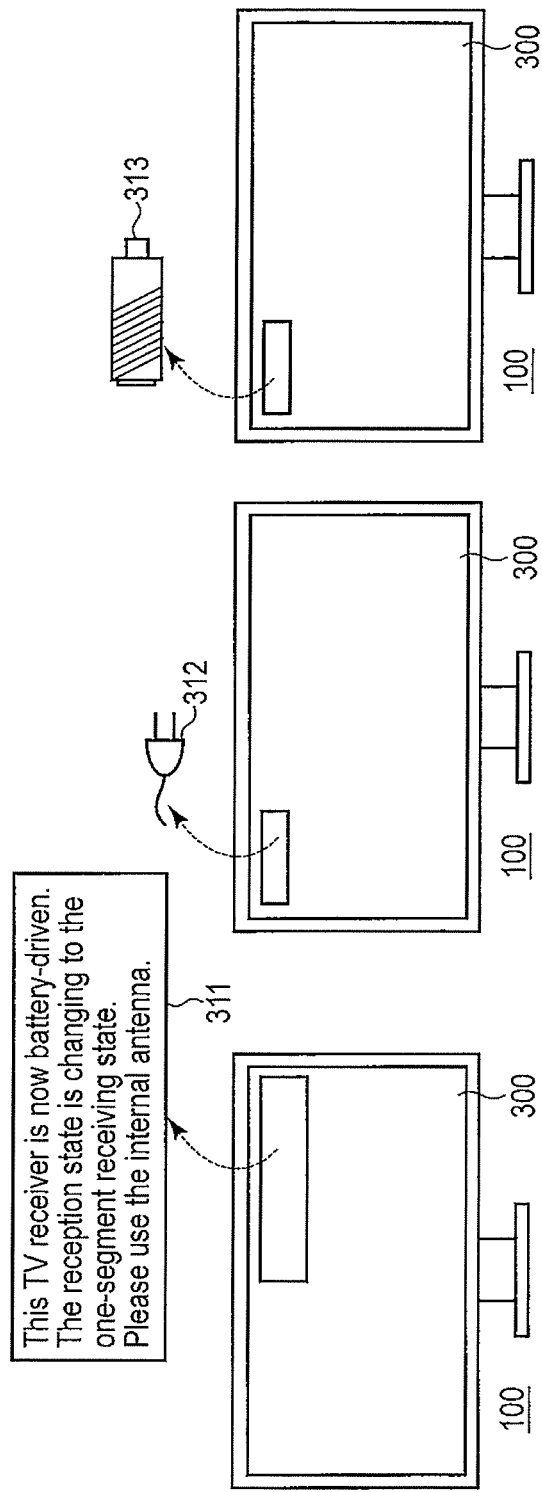
FIG. 4A, FIG. 4B and FIG. 4C are exemplary diagrams, each showing an exemplary message and exemplary icons the television receiver of FIG. 1 is displayed, according to an embodiment.

While the television receiver 100 is using the commercially available power, the display 300 displays a plug icon 312 at the corner of the screen shown in FIG. 4B. While the television receiver 100 is using the battery power, the display 300 displays, at the corner of the screen, a battery icon 313 shown in FIG. 4C that indicates the amount of power remaining in the battery 558. Note that the plug icon and the battery icon can have various shapes and can include characters, as long as they inform the user of the type of power supply now used.

The remote controller 700 further has a power-save button 722.

The remote controller 700 further has a power-save button 722. When pushed, the power-save button 722 switches the television receiver 100 to a power saving state for power saving mode). In the power saving mode, the screen of the display 300 becomes dark and the image-quality parameters are changed values, and power is thereby saved. More specifically, when the user pushes the power-save button 722, the luminosity of the backlight is decreased, thereby saving power. At the same time, the image parameters, such as black level, unicolor level and color temperature, are adjusted, displaying an image that is dark but can be seen well. When the power-save button 722 is pushed again, the screen of the display 300 acquires the standard brightness, and the image-quality parameters are changed back to the standard values.

The remote controller 700 also has a terrestrial digital broadcast button 723 and a one-segment button 724.

When pushed, the terrestrial digital broadcast button 723 sets the television receiver 100 to the full-segment receiving mode. When pushed, the one-segment button 724 sets the television receiver 100 to the one-segment receiving mode. Once the television receiver 100 has been set to the one-segment receiving mode, the indoor antenna 105 is used to receive a one-segment broadcast signal, as explained with reference to FIG. 1.

The antenna may be automatically switched from the UHF antenna 101 to the indoor antenna 105, or vice versa, by a switch provided on the antenna connection board 108. As shown in FIG. 2A, the remote controller 700 has channel selection buttons 730, which are labeled "1" to "12," respectively. The remote controller 700 further has a volume button 726 and a channel switching button 727. The volume button 726 is used to adjust the volume of the sound. The volume of the sound is increased when the "+" end of the button 726 is pushed. The volume of the sound is decreased when the "−" end of the button 726 is pushed. Every time the channel switching button 727 is pushed at the upper end (in FIG. 2A), the receiving channel of the TV may be changed to the immediately greater channel of the number. Every time the channel switching button 727 is pushed at the lower end (in FIG. 2A), the receiving channel of the TV may be changed to the immediately smaller channel of the number.

The remote controller 700 has buttons 731, 732 and 733 arranged in a column.

If pushed, the button 731 causes the display 300 to display, temporarily, detailed data items such as the name and channel number of the broadcast station transmitting the program now received, the one-segment or full-segment receiving mode, and the type of video and Audio data (monaural or stereophonic). If pushed, the button 732 labeled "silence button" causes the speaker 204 to stop outputting sound. If pushed, the button 733 labeled "quick menu" causes the display 300 to display a quick menu. The quick menu includes various image-setting items, sound-setting items, power-saving items and reception-setting items, etc. While looking at the quick menu displayed, the user moves a cursor in the screen of the display 300, to any desired item, and then pushes a select button 741 provided on the remote controller 700, thereby selecting the desired item. The display 300 then displays the item selected, in detail.

The buttons 74L, 74R, 740 and 740 are pushed, the cursor moves leftward, rightward, upward and downward, respectively, on the screen of the display 300. The select button 741 may be pushed to determine the desired item the cursor points to on the screen of the display 300.

The remote controller 700 still further has buttons 745, 746 and 747. If the button 745 is pushed, the display 300 will display a menu of image. If the button 746 is pushed, a program table is displayed. If the button 747 is pushed, the television receiver 100 will be set back to the previous operating mode.

FIG. 3 shows how the television receiver 100 operates when it is switched from the one-segment receiving mode to the full-segment receiving mode, or vice versa. Assume that the receiving mode is switched to the one-segment receiving mode while the external antenna remains connected to the tuner 110 (Steps SA1 to SA3). This switching is achieved by a signal the user has input at the remote controller 700, a signal manually generated, or a signal automatically generated by a timer or in accordance with power-save data.

When the receiving mode is switched to the one-segment receiving mode, it is determined whether the commercially available AC power is supplied to the television receiver 100 (Step SA4). If the commercially available AC power is supplied to the television receiver 100 (YES in Step SA4), the process is terminated while the television receiver 100 remains in the one-segment receiving mode. If the commercially available AC power is not supplied to the television receiver 100 (NO in Step SA4), the process goes to Step SA7, in which the battery 553 is used. Then, the internal antenna 105 is used (Step SA8).

The process then returns to Step SA3, and if the full-segment reception is selected, the television receiver 100 is set to the full-segment receiving mode. In the full-segment receiving mode, it is frequently checked as to whether the commercially available AC power is supplied to the television receiver 100 (Step SA5). As long as the commercially available AC power is supplied to the television receiver 100, the full-segment reception continues. When the supply of the commercially available AC power stops, the television receiver 100 is automatically switched to the one-segment receiving mode (Step SA6). The battery 553 is therefore used (Step SA7), and the internal antenna 105 is used (Step SA8).

The user can thus switch the television receiver 100 to whichever receiving mode, i.e., full-segment receiving mode or one-segment receiving mode. Therefore, if the AC power supply is used, the user may set the television receiver 100 to the one-segment receiving mode, in order to save power.

Whether set in the full-segment receiving mode or the one-segment receiving mode, the television receiver 100 automatically assumes the one-segment receiving state and is battery-driven immediately, when the supply of the commercially available AC power is stopped. If a blackout should occur for some reason, the television receiver 100 would keep operating, giving audio-visual information to the user.

The battery 553 may be recharged at midnight, for example, when the power generation plant is generating more power than is necessary. In this regard, the television receiver 100 can display a recharging menu, which shows various time slots for recharging the battery 553. The user operates the remote controller 700, selecting the cursor on the screen of the display 300, and the select button 741, thereby selecting the desired time slot. Then, the battery 553 will be recharged in the time slot the user has selected, unless a blackout occurs in the time slot selected.

The television receiver 100 is so designed that the battery 553 is never recharged while it is displaying any program. That is, the power output circuit 500 can indeed supply the commercially available AC power to the battery 553, but supplies no AC power to the battery 553 as long as the television receiver 100 displays any program.

If the user pushes the peak-shift button 721, the battery 553 drives the television receiver 100. The battery 553 may be used in a power peak period such as a few hours in a summer afternoon. This use of the battery 553 helps prevent an increase in power consumption in the power peak period. Thus, whether the power peak period can be shifted or not, it is depends on whether the user selects a power peak shift button at an appropriate time.

In a blackout, no power is supplied to the booster 102 of the antenna 101, and the display 300 may not display the program. Even in this case, either an attached antenna or the indoor antenna 105 is utilized to achieve the one-segment reception at the event of a blackout. The television receiver 100 can be battery-driven for three hours, more or less.

Various measures can be taken to detect blackouts. The power-supply control system 402a is connected to, for example, a backup capacitor, and can keep operating for a prescribed time even if a blackout takes place. Therefore, the changes in the voltage on the power supply lines and the output of the AC adaptor 552 can be detected.

When a blackout (non-energized state of the commercially available power or decrease in output of the AC adaptor) is detected, the power-supply control system 402a switches the switch (SW) 502 of the power output circuit 500 to the battery 553. That is, the television receiver is operated by an output of the battery 553 set to a predetermined voltage and current (maximum supply value) provided by the DC/DC converter 501.

Switching of the power source, which supplies power to the television receiver, to the battery 553 is also performed when the peak-shift button 721 is turned on. In this case, since neither a non-energized state of the commercially available power nor decrease in output of the AC adaptor 552 occurs, the switch (SW) 502 of the power output circuit 500 does not completely interrupt the input from the AC adaptor 552. That is, a power of approximately 1 W is supplied from the AC adaptor 552 even after the peak-shift button 721 is turned on and the power source is switched to the battery 553.

Thereby, even when the power supply ability (of a level capable of discharging) of the battery 553 has decreased and the operation of the television receiver cannot be continued, for example, the power output circuit 500 is capable of operating the television receiver using the power supplied from the AC adaptor 552 if the AC (commercially available) power is supplied at that point in time. That is, since the switch 502 includes the switching element, as described above, or a power connection (a plurality of power-supply systems including at least one non-interruption line) capable of at least connecting a power of approximately 1 W from the AC adaptor 552 (commercially available power), the power supply from the battery 553 and the power supply from the AC adaptor 552 can be used in combination.

Accordingly, even when the amount of charge (remaining amount) of the battery 553 has decreased below a non-discharge level, for example, the television receiver can be operated using the power (the commercially available power converted into a direct-current output) supplied from the AC adaptor 552 if the AC (commercially available) power is supplied at that point in time. It is thereby possible to greatly suppress consumption of power supplied from the commercially available power to the television receiver which allows the user to view television broadcasting using the power supply from the battery, when the total amount of the power used is nearly reaching the maximum supply ability of the commercially available power (commercially available AC power), i.e., when the usage amount of the power supplied from the commercially available power should be suppressed, for example.

Further, even when the power supply ability of the battery of a television receiver which operates using the power from the battery has reached the lower limit, if a commercially available power is supplied at that point in time, it is possible to operate the television receiver using the direct-current output converted from the commercially available power supplied from the AC adaptor 552.

It is thereby possible for the user to continue receiving and viewing the television broadcasting, i.e., the program of the television receiver, regardless of whether the power source is a commercially available power or a self-supplied power such as a battery. Since an operation instruction via a remote controller can be received by supplying the power of approximately 1 W from the AC adaptor 552 (commercially available power) during switching of the power source, in particular, switching from the self-supplied power to a commercially available power, the switching from the self-supplied power to the commercially available power can be performed only through manipulation of the remote controller for viewing the television broadcasting.

The power output circuit 500 may integrate a power circuit (inverter/switching circuit) configured to convert the commercially available power into a direct-current output in place of the AC adaptor 552. In this case, the switching frequency of the switching circuit may be set such that the power that passes through the switch (SW) 501 becomes approximately 1 W while the television receiver is operated using the power from the battery 553.

Figure 10:
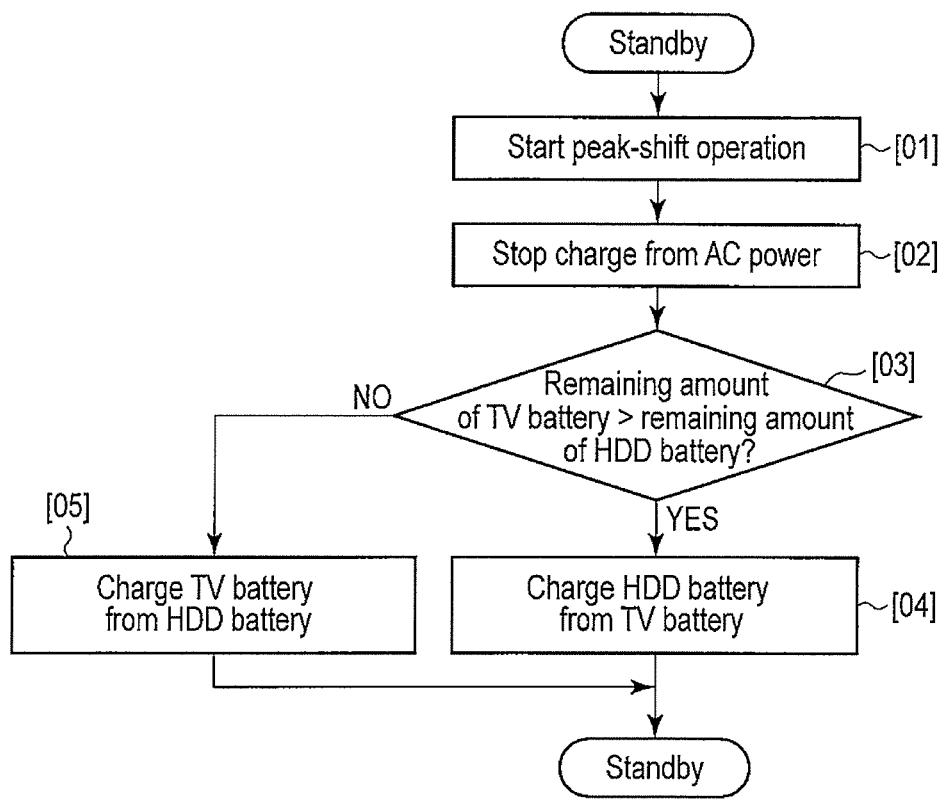
FIG. 10 is an exemplary diagram showing an example of power supply between the television receiver of FIG. 1 and an external apparatus, according to an embodiment.
Figure 11:
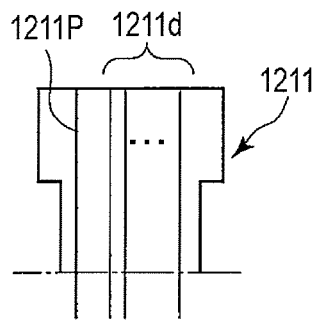
FIG. 11 is an exemplary diagram showing an example of connection between the television receiver of FIG. 1 and an external apparatus connected thereto and power supply to the external apparatus, according to an embodiment.

When the peak-shift button 721 is turned on, charge and discharge (power supply to the television receiver) of the battery 208 and the battery 553 are performed by putting a high priority on reception of the television broadcasting by the television receiver, as illustrated in the lower part of FIG. 10, according to the amount of charge (remaining amount) of the battery 553 and the amount of charge (remaining amount) of the battery 208 of the HDD 207 connected via the USB 206.

Switching of the battery can be implemented by the power output circuit 500 (the switch (SW) 502, in particular) and the USB 206 connected to the signal processor 200, under the control of the power control system 402a of the sub-MPU 402 of the control block 400, for example.

FIG. 4A shows an exemplary guidance message the display 300 displays when the power supply is switched from the commercially available AC power supply to the battery 553. At the time the power supply is switched to the battery 553, or at a blackout, the power supply to the booster 102 of the external antenna 101 is stopped, and the display 300 may no longer display the image. In this case, the display 300 displays a guidance message 311 of "This TV receiver is now battery-driven. The reception state is changing to the one-segment receiving state. Please use the internal antenna." The term "internal antenna" may be replaced by "attached antenna" or "one-segment receiving antenna".

FIG. 4B shows a plug-shaped icon 312 the display 300 displays while the television receiver 100 is using the commercially available AC power supply. FIG. 4C shows a battery-shaped icon 313 the display 300 displays while the television receiver 100 is using the battery 553. The battery-shaped icon 313 indicates the amount of power remaining in the battery 553. (More precisely, the number of slant lines is proportional to the power remaining in the battery 553.)

FIG. 5 shows time T1 at which the reception state is switched from the full-segment receiving state to the one-segment receiving state, and time T2 at which the image is actually switched from the full-segment image to the one-segment image. Some time lapses until a one-segment image is displayed after the reception state has been switched from the full-segment receiving state to the one-segment receiving state. Therefore, the full-segment image remains displayed on the screen until the one-segment video data is output. When the one-segment video data is output, the full-segment image is switched to the one-segment image on the screen of the display 300. Until the one-segment video data is output, a message showing this fact may be displayed on the screen of the display 300.

The user may push the peak-shift button 721 to save the commercially available power (supplied from the power generation plant of the electric power company). If the peak-shift button 721 is pushed, the television receiver 100 stops using the commercially available power and starts using the battery 553. If the peak shift-button 721 is pushed while the battery 553 is being used, the television receiver 100 is set to the one-segment receiving state.

FIG. 6A to FIG. 6E show exemplary images the display 300 displays after the television receiver 100 has been set to the one-segment receiving state.

Once set to the one-segment receiving state, the television receiver 100 can display an image 320 on the screen, as shown in FIG. 6A. In this state, the battery 553 is being used. So this state helps to save the power supplied by the electric power company. Further, in order to reduce the consumption of the battery power, the image can be displayed as shown in FIG. 6B, in a small size in, for example, the center part of the screen.

If a high-luminance image 320 of the small size is displayed in the same part of the screen for a long term, the activating time of the high-luminance pixels defining the image 320 will differ from the activating time of the pixels surrounding the image 320, and the activating time of the backlight elements in the region of the image 320 will differ from the activating time of the backlight elements in the region surrounding the high-luminance image 320. Consequently, the screen of the display 300 has a conspicuous line, in some cases, at the boundary between the part where the high-luminance image 320 is displayed and the part where no high-luminance images are displayed. In view of this, the television receiver 100 is designed to move the region of the image 320 of the small size on the screen as shown in FIG. 6B, FIG. 6C or FIG. 6D. The image 320 may be moved at various times, for example, when an advertisement starts, or when a prescribed period is passed, or when a prescribed period is passed then an advertisement starts.

Further, the size of the image 320 displayed can be more reduced as shown in FIG. 6E, for the purpose of saving power.

FIG. 7A and FIG. 7B show the structure of the backlight unit of the display 300, which can change the position and size of the display area of the display 300. The display 300 has a light guide plate 331. The backlight unit has horizontal light source elements 332 and vertical light source elements 333. The light beams emitted from the light source elements 332 and 333 are reflected in the light guide plate 331 and guided toward the front surface of the light guide plate 331, thus functioning as a backlight. The light source elements 332 and 333 are, for example, light-emitting diodes (LEDs). The light beams emitted from the light source elements 332 and 333 are diffused in the light guide plate 331. Therefore, light of uniform intensity emerges from the front surface of the light guide plate 331.

More specifically, the horizontal light source elements 332 are eight light sources H1 to H8, and the vertical light source elements 333 are eight light sources V1 to V8. If the light sources H1, H0, V1 and V8 are turned off, the peripheral part of the light guide plate 331 will appear dark. The boundary between the dark region and the bright region is not clear-cut. Nonetheless, the backlight region can be controlled.

Therefore, in order to display such images 320 as shown in FIG. 6B to FIG. 6E, the signal processor 200 outputs a video signal so that the display 300 may display an image 320 surrounded by a dark frame at zero-luminance level. If the backlight unit of the display 300 operates, displaying such an image as shown in FIG. 6B, 6C, 6D or 6E, more power can be saved than otherwise.

Figure 8A:
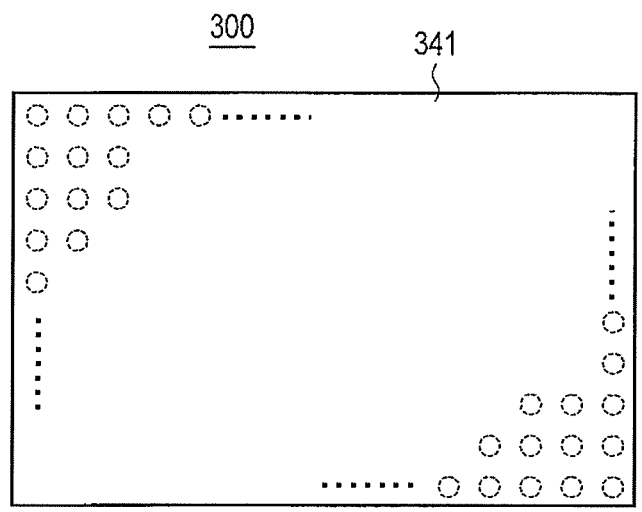
FIG. 8A and FIG. 8B are exemplary diagrams, each showing another structure the backlight unit of the display of the television receiver of FIG. 1 for using, according to an embodiment.
Figure 8B:
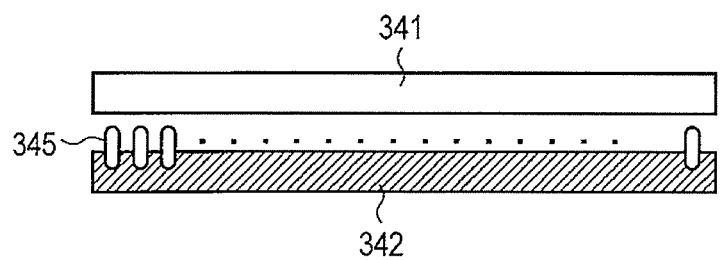

FIG. 8A and FIG. 8B show another structure the backlight unit of the display 300 may have. The display 300 has a glass substrate 341 and a substrate 342 arranged at the back of the glass substrate 341. On the substrate 342, light-emitting elements (LEDs) are arranged, in a two-dimensional pattern. The light-emitting elements can be turned on and off, in units of groups each consisting of the same number of light-emitting elements. A backlight drive circuit (not shown) can drive any selected group of light-emitting elements. A light diffusion layer is formed on the back of the glass substrate 341, and light therefore emerges from the glass substrate 341 with uniform intensity. As a result, the boundary between any bright region and any dark region is not always clear on the entire glass substrate 341. The backlight region can be controlled, nevertheless.

In order to display such an image 320 as shown in FIG. 6B, 6C, 6D or 6E, the signal processor 200 outputs a video signal containing data representing a dark frame at zero-luminance level. If the display 300 displays an image 320 of this type (shown in FIG. 6B, 6C, 6D or 6E), its backlight unit consumes less power than otherwise.

The backlight unit of the display 300 is not limited to the configuration described above. The backlight unit may have a plurality of fluorescent lamps instead. Further, the number of segments into which the display region is divided is not limited to the number specified above. The number of segments can be changed as needed, in the same manner as described above.

As stated above, the backlight region can be controlled. In order to save power, the backlight region may be controlled in terms of illumination intensity, thereby to save power. To be more specific, the illumination intensity of the entire backlight region may be decreased, in order to reduce the power consumption in the backlight unit. The illumination intensity of the backlight region may be changed to various values in step by step. Moreover, the backlight region can, of course, be changed in both size and illumination intensity.

Displays having a large screen have been developed for use in television receivers. The light sources used in these displays are, for example, fluorescent lamps or light-emitting elements (e.g., LEDs, organic electroluminescent diodes or plasma display).

To save power in the large-screen display of the television receiver will greatly contribute to power saving in society. To switch the reception state of the television receiver, from the full-segment receiving state to the one-segment receiving state, will also save much power.

The television receiver 100 can perform the operations described above. More precisely, the television receiver 100 can perform various combinations of operations, in accordance with the application program provided in the control block 400.

In the one-segment receiving state, the control block 400 can set the display 300 supplied with the video signal output from the signal processor 200, to a full-screen display state. In another embodiment, the control block 400 can, in the one-segment receiving state, set the display 300 supplied with the video signal output from the signal processor 200, to a partial-screen display state, and then turn off some of the light-emitting elements of the backlight unit. In still another embodiment, the control block 400 can, in the one-segment receiving state, set the display 300 supplied with the video signal output from the signal processor 200, from the full-screen display state to the partial-screen display state, and then turn off some of the light-emitting elements of the backlight unit, when the power in the battery 553 decreases to a prescribed value. In another embodiment, the control block 400 can, in the one-segment receiving state, set the display 300 supplied with the video signal output from the signal processor 200, to the full-screen display state or the partial-screen display state, and turn off some of the light-emitting elements of the backlight unit, thereby to set the display 300 to one display state in response to the selection signal the user has input. Further, the display 300 can display a message, prompting the user to operate the remote controller 700.

Moreover, in another embodiment, the tuner 110 can receive a broadcast signal from the external antenna 101 and the power output circuit 500 can supply power to the booster 102 of the external antenna 101, if the reception state has been set to the one-segment receiving state. In still another embodiment, the tuner 110 can receive the broadcast signal from the external antenna 101 and the power output circuit 500 can stop supplying power to the booster 102 of the internal antenna 105, if the reception state has been set to the one-segment receiving state. In a further embodiment, tuner 110 can receive a broadcast signal from the attached antenna and the power output circuit 500 can stop supplying power to the booster 102 of the external antenna 101, if the reception state has been set to the one-segment receiving state. In any of these cases, the antenna may be switched automatically, or the user may switch the antenna in accordance with the instruction the display 300 shows.

Moreover, in still another embodiment, the image 320 shown in FIG. 6A to FIG. 6E can be changed in size in accordance with the power remaining in the battery 553 or in response to an instruction the user has input. In addition, the audio-system circuits may be turned off, while keeping the video signal active, thereby to save power. Conversely, the video-system circuits may be turned off, while keeping the audio signal active, thereby to save power.

Figures 9A, 9B:
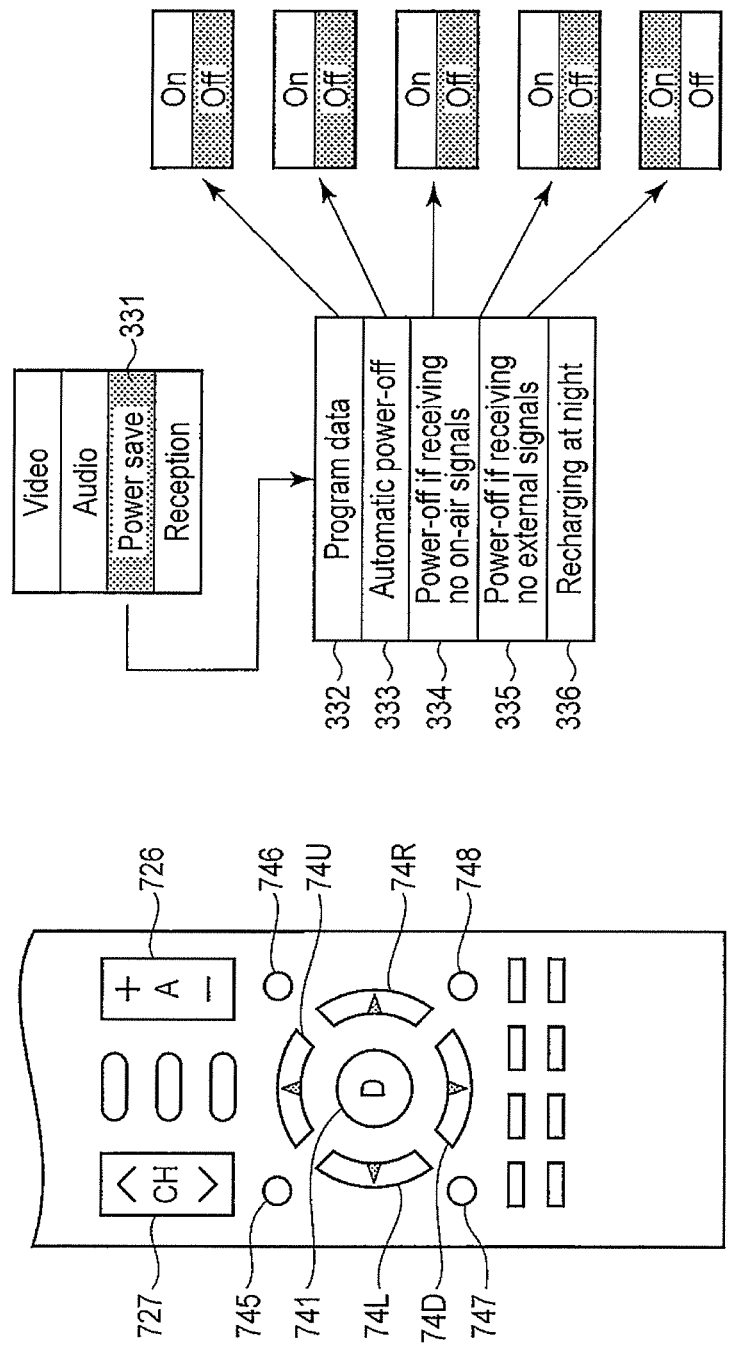
FIG. 9A and FIG. 9B are exemplary diagrams, each showing an exemplary of power-saving menu the display of the television receiver of FIG. 1 may display, helping the user to set a power-saving function at the remote controller, according to an embodiment.

FIG. 9A shows the remote controller 700 having various buttons, and FIG. 9B shows an exemplary power-saving menu the user may use to save power in the television receiver 100. If the user pushes the quick menu button 733, the display 300 displays the quick menu showing four items, i.e., "video setting", "audio setting", "power-save setting" and "receiver setting". The user pushes the button 74U or button 74D, moving the cursor to the desired item, and then pushes the select button 741, selecting the desired item. Assume that the user moves the cursor to, for example, the power-save setting 331 and then pushes the select button 741. Then, the display 300 displays the menu of the next layer, which consist of "program data acquisition", "automatic power-off", "off to no on-air signal", "off to no external input" and "battery recharging at night". If the user selects one of these menu items, the display 300 displays an on-button and an off-button beside the menu item selected.

If the user moves the cursor to, for example, "program data acquisition (EPG data)", an on-button and an off-button are displayed beside "program data acquisition". The user operates the button 74U or 74*d*, moving the cursor to, for example, "on-button", and then pushes the select button 741. In this case, the television receiver 100 acquires a digital broadcast program while the power switch of the television receiver 100 remains off (that is, while the receiver 100 remains in the standby state). If the user selects "off-button", the television receiver 100 will acquire no program data.

Assume that the cursor is moved to "automatic power-off". Then, an on-button and an off-button are displayed beside "automatic power-off". The user operates the button 74U or 74*d*, moving the cursor to, for example, "on-button", and then pushes the select button 741. In this case, the television receiver 100 stops receiving power and is turned off, assuming the standby state, if it remains not operated at all for three hours. If the user selects "off-button", the television receiver 100 keeps receiving power even if it remains not operated at all for three hours.

Further assume that the cursor is moved to "off to no on-air signal". Then, an on-button and an off-button are displayed beside "off to no on-air signal". The user operates the button 740 or 74*d*, moving the cursor to, for example, "on-button", and then pushes the select button 741. In this case, the television receiver 100 stops receiving power, and assumes the standby state if it receives no broadcast signals for about 15 minutes. If the user selects "off-button", the television receiver 100 keeps receiving power even if it keeps receiving no signals.

Assume that the cursor is moved to "off to no external input", then, an on-button and an off-button are displayed beside "off to no external input". The user operates the button 74U or 74*d*, moving the cursor to, for example, "on-button", and then pushes the select button 741. If the television receiver 100 keeps receiving no signals for 15 minutes in an external-input selecting mode, the television receiver 100 stops receiving power, and assumes the standby state. If the user selects "off-button", the television receiver 100 keeps receiving power even if it keeps receiving no signals.

Assume that the cursor is moved to "battery recharging at night". Then, an on-button and an off-button are displayed beside "battery recharging at night". The user operates the button 74U or 74*d*, moving the cursor to, for example, "on-button," and then pushes the select button 741. In this case, the battery 553 is automatically recharged, for example, from 10:00 PM to 9:00 AM (if the television receiver 100 is in the standby state). If the user moves the cursor to "off-button" and pushes the select button 741, the battery 553 is set to be recharged when the television receiver 100 is in the standby state.

The television receiver 100 described above can be controlled to save power, as the user operates the mobile terminal 800, as will be explained below.

FIG. 10 illustrates the amount of charge (remaining amount) of the battery (of the television receiver) and charge and discharge (power supply to the television receiver) of the battery (of the HDD) when the peak-shift button is turned on and the peak-shift mode is activated.

When the peak-shift button is turned on, the peak-shift mode of the television receiver is activated [01], and charging of the battery 553 integrated in the television receiver and the battery 208 integrated in the USB-HDD 207 via the television receiver is stopped. That is, battery charging is stopped by the AC power component drawn via the AC adaptor 552 [02].

After that, the battery that supplies power to the television receiver is specified according to the remaining amount (amount of charge) of each of the battery 553 (of the television receiver) and the battery 208 (of the HDD (external apparatus)). Accordingly, at the point in time when the peak-shift button is turned on, the remaining amount (amount of charge) of each of the battery 553 (of the television receiver) and the battery 208 (of the HDD (external apparatus)) is obtained so as to determine which of the batteries has a greater remaining amount [03].

When the battery 553 (of the television receiver) has a greater remaining amount than the remaining amount of the battery 208 (of the HDD (external apparatus)) [03—YES], the remaining amount of the HDD battery will be equal to or less than a first predetermined value. When the battery of the television receiver is equal to a second predetermined value (where the second predetermined value is equal to or greater than the first predetermined value), the battery of the television receiver charges the battery of the HDD until the remaining amount of the battery integrated in the television receiver becomes equal to or less than the second predetermined value (i.e., power is supplied from the battery of the television receiver to the battery of the HDD) [04]. The first predetermined value is a remaining amount capable of operating the television receiver for at least 3 hours.

When the battery 553 (of the television receiver) has a remaining amount less than the remaining amount of the battery 208 (of the HDD (external apparatus) [03—NO], on the other hand, the remaining amount of the battery of the HDD becomes equal to or less than a first predetermined value. When the remaining amount of the battery of the television receiver is equal to a second predetermined value (where the second predetermined value is equal to or less than the first predetermined value (i.e., the battery of the USB-HDD has a greater remaining amount)), the power is supplied from the battery of the HDD to the television receiver until the battery of the HDD runs out [05]. The first predetermined value of the HDD battery is a remaining amount capable of operating the television receiver for at least 3 hours, even if certain restrictions are placed on the operation of the HDD.

That is, when each of the television receiver and the external apparatus (USB-connected USB-HDD) includes a battery, both of the batteries are charged while the AC power (external power) is supplied. When the remaining amount (amount of charge) of the battery of the television receiver is greater than the remaining amount (amount of charge) of the battery of the USB-HDD at the point in time when the peak-shift mode, in which the AC power is not used, is activated, the battery of the television receiver continues charging the battery of the USB-HDD. When the remaining amount (amount of charge) of the battery of the television receiver is less than the remaining amount (amount of charge) of the battery of the HDD at that point in time, the power of the battery of the HDD is supplied to the television receiver, prior to the battery power of the television receiver, to operate the television receiver. It is thereby possible to operate the television receiver for at least 3 hours even if certain restrictions are placed on the operation of the HDD.

The charging capacities of the batteries of the television receiver and the external apparatus (USB-connected USB-HDD) are set such that the battery of the television receiver has a charging capacity greater than that of the battery of the external apparatus (HDD).

By thus applying the above-described embodiment, it is possible to maintain the operation of the television receiver, i.e., to provide continued reception and viewing of the television broadcasting for a certain period of time using the power (discharge ability) of the battery when each of the television receiver and the external apparatus (USB-connected USB-HDD) includes a battery. When the power is transferred between the television receiver and the external apparatus (USB-HDD), there is a problem that lack of charge of the battery of the USB-HDD due to a connection error by the user, for example, can cause lack of power (amount of charge) necessary for operating the television receiver and affect the operation of the television receiver. By providing an independent power line or a dedicated line for power supply inside the USB connector (package), it is possible to prevent such a problem.

Figure 12:
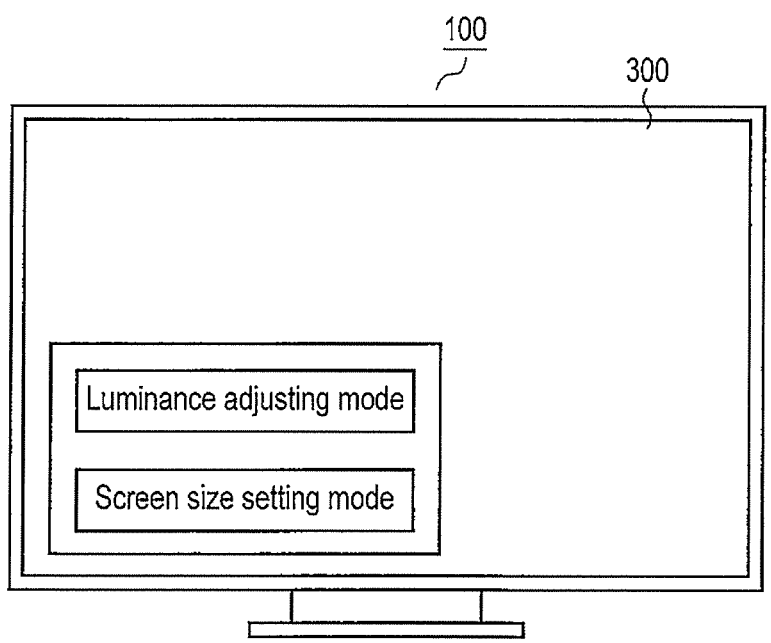
FIG. 12 is an exemplary diagram showing an example of setting menu the display of the television receiver of FIG. 1 may display, helping the user to select a power-save mode or a peak-shift mode, according to an embodiment.

FIG. 12 is a diagram showing an exemplary setting menu the display 300 of the television receiver of FIG. 1 may display, helping the user to set the television receiver 100 to a power-save mode and/or peak-shift mode.

The television receiver 100 according to the embodiment can be set to the operation of the power-save mode and/or the peak-shift mode. That is, the user can select the operation of the power-save mode and/or the peak-shift mode. In the power-save mode and/or the peak-shift mode, the luminance may be decreased to save power, and/or the image size may be reduced to save power. More specifically, the user may move the cursor to "luminance adjusting mode" and/or "image-size setting mode" displayed by the display 300, and push the select button 741. As a result, the television receiver 100 is set to the power-save mode and/or peak-shift mode. The display 300 may display another choice of "luminance/image-size setting mode", in addition to "luminance adjusting mode" and "image-size setting mode".

FIGS. 13A and 13B show two luminance indicators, respectively.

When the television receiver 100 starts operating on the commercially available AC power or when a channel switching is performed while the television receiver 100 is operating on commercially available AC power, the display 300 displays the luminance indicator of FIG. 13A, which indicates where the luminance level lies between the maximum value (bright) and the minimum value (dark). The indicator shown in FIG. 13A indicates a luminance of intermediate level. When the television receiver 100 is set to the peak-shift mode, the display 300 displays the luminance indicator of FIG. 13B. The indicator shown in FIG. 13B indicates luminance of the second darkest level.

Accordingly, when each of the television receiver and the external apparatus (USB-connected USB-HDD) includes a battery, the user is allowed to know the timing (trigger) to drive the battery so as to operate the television receiver using the power (discharge ability) of the battery for a certain period of time, i.e., to turn on the peak-shift button, by referring to the display example of the display 300 during the power saving mode or the peak-shift operation.

Further, by applying the above-described embodiment, it is possible to obtain a television receiver capable of contributing to saving power of power suppliers.

The television receiver 100 according to any one of the embodiments described above can save power, while performing all of its functions. Further, even upon a blackout, the television receiver can save power, while performing all of its functions. Moreover, the television receiver 100, which has not only ordinary functions, but also a power-saving function, may be bought by consumers willing to save power, ultimately reducing the power consumption in society.

The television receiver 100 according to any one of the embodiments described above can save power, while performing all of its functions. Further, even upon a blackout, the television receiver can save power, while performing all of its functions. Moreover, the television receiver 100, which has not only ordinary functions, but also a power-saving function, may be bought by consumers willing to save power, ultimately reducing the power consumption in society.

In order to save power, the display 300 may be controlled to set at least one-third (⅓) of the screen of the display 300 to low luminance in the one-segment receiving state, and display the image in the remaining part of the screen. In this case, those of the light-emitting elements of the backlight unit, which lie behind one-third (⅓) of the screen, are turned off. Moreover, the image so displayed can move, with time, over the entire screen. Said remaining part of the screen can be changed in size in accordance with how much power should be saved in the television receiver 100.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video display apparatus comprising:
   a first battery configured to be charged while a commercially available power is connected;
   a second battery connected as an external apparatus and configured to be charged together with the first battery while the commercially available power is connected; and
   a power switching module configured to supply power from at least one of the first battery or second battery upon receipt of an instruction to stop connection with the commercially available power, the power switching module switching the power between the first battery and the second battery according to a remaining amount of each of the first battery and the second battery upon receipt of an instruction to stop connection with the commercially available power,
   wherein the power switching module compares the remaining amount of the first battery and the remaining amount of the second battery and, when the remaining amount of the first battery is greater than a predetermined value, supplies power to the second battery until the remaining amount of the first battery reaches the predetermined value.

2. The display apparatus of claim 1, wherein the second battery functions as a power source configured to operate the video display device itself.

3. A video display apparatus comprising:
   a first battery configured to be charged while a commercially available power is connected;
   a second battery connected as an external apparatus and configured to be charged together with the first battery while the commercially available power is connected; and
   a power switching module configured to supply power from at least one of the first and second batteries upon receipt of an instruction to stop connection with the commercially available power, the power switching module switching the power between the first battery and the second battery according to a remaining amount of each of the first battery and the second battery upon receipt of an instruction to stop connection with the commercially available power,
   wherein the power switching module compares the remaining amount of the first battery and the remaining amount of the second battery and, when the remaining amount of the first battery is less than both of a predetermined value and the remaining amount of the second battery, derives power from the second battery.

4. The display apparatus of claim 3, wherein the second battery functions as a power source configured to operate the video display device itself.

5. A method of driving a video display apparatus, comprising:
   including a first battery configured to be charged while a commercially available power is connected and a second battery connected as an external apparatus and configured to be charged together with the first battery while the commercially available power is connected; and
   supplying power to a reception module configured to receive at least a video signal and an audio signal, a playback module configured to play back the video signal and the audio signal received by the reception module, a display module configured to display the video played back by the playback module, and a control module configured to control operation of at least the reception module, the playback module, and the display module, by switching power between the first battery and the second battery according to a remaining amount of each of the first battery and the second battery upon receipt of an instruction to stop connection with the commercially available power,
   wherein the remaining amount of the first battery and the remaining amount of the second battery are compared, and when the remaining amount of the first battery is greater than a predetermined value, power is supplied to the second battery until the remaining amount of the first battery reaches the predetermined value.

6. A method of driving a video display apparatus comprising:
   a first battery configured to be charged while a commercially available power is connected and a second battery connected as an external apparatus and configured to be charged together with the first battery while the commercially available power is connected; and
   supplying power to a reception module configured to receive at least a video signal and an audio signal, a playback module configured to play back the video signal and the audio signal received by the reception module, a display module configured to display the video played back by the playback module, and a control module configured to control operation of at least the reception module, the playback module, and the display module, by switching power between the first battery and the second battery according to a remaining amount of each of the first battery and the second battery upon receipt of an instruction to stop connection with the commercially available power,
   wherein the remaining amount of the first battery and the remaining amount of the second battery are compared, and when the remaining amount of the first battery is less than both of a predetermined value and the remaining amount of the second battery, power is switched from the second battery to the first battery.

7. A television receiver comprising:
   a reception module configured to receive a video signal and an audio signal;
   a playback module configured to play back the video signal and the audio signal received by the reception module;
   a display module configured to display the video played back by the playback module;
   a control module configured to control operation of at least the reception module, the playback module, and the display module;
   an instruction input module configured to receive a control instruction to the control module;
   a first battery configured to be charged while a commercially available power is connected;
   a second battery connected as an external apparatus and configured to be charged together with the first battery while the commercially available power is connected; and
   a power control module configured to supply power to each module from the first battery or the second battery by switching power between the first battery and the second battery according to a remaining amount of each of the first battery and the second battery upon receipt of an instruction to stop connection with the commercially available power, wherein the power control module is configured to compare the remaining amount of the first battery and the remaining amount of the second battery and, when the remaining amount of the first battery is greater than a predetermined value, to supply power to the second battery until the remaining amount of the first battery reaches the predetermined value.

8. A television receiver, comprising:
a reception module configured to receive a video signal and an audio signal;
a playback module configured to play back the video signal and the audio signal received by the reception module;
a display module configured to display the video played back by the playback module;
a control module configured to control operation of at least the reception module, the playback module, and the display module;
an instruction input module configured to receive a control instruction to the control module;
a first battery configured to be charged while a commercially available power is connected;
a second battery connected as an external apparatus and configured to be charged together with the first battery while the commercially available power is connected; and
a power control module configured to supply power to each module from the first battery or the second battery by switching power between the first battery and the second battery according to a remaining amount of each of the first battery and the second battery upon receipt of an instruction to stop connection with the commercially available power, wherein the power control module is configured to compare the remaining amount of the first battery and the remaining amount of the second battery and, when the remaining amount of the first battery is less than both of a predetermined value and the remaining amount of the second battery, to derive power from the second battery.

* * * * *